March 30, 1926.  
S. A. GAFVERT  
METER MOUNTING  
Filed Sept. 16, 1922

Inventor  
S. A. GAFVERT  
By his Attorneys

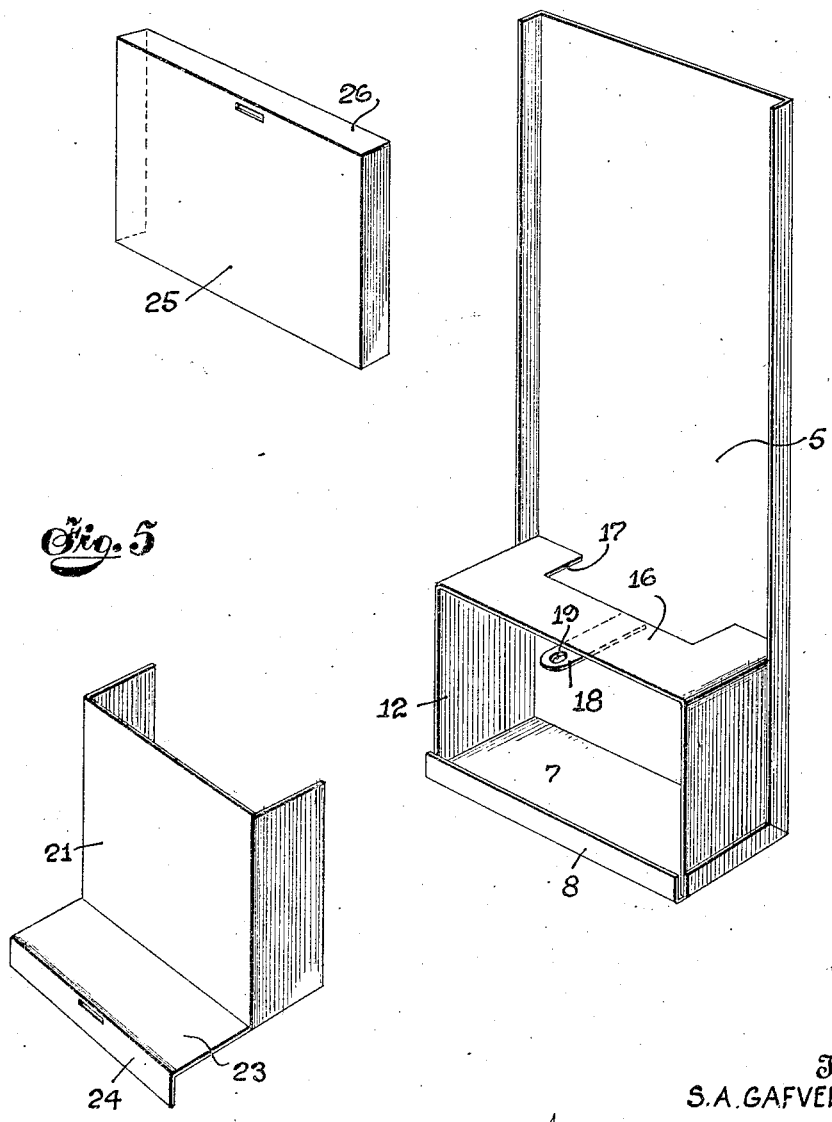

Patented Mar. 30, 1926.

1,578,506

UNITED STATES PATENT OFFICE.

SVEN A. GAFVERT, OF NEW YORK, N. Y.

METER MOUNTING.

Application filed September 16, 1922. Serial No. 588,735.

*To all whom it may concern:*

Be it known that I, SVEN A. GAFVERT, a subject of the King of Sweden, and a resident of New York, in the county of New York and State of New York, have invented certain new and useful Improvements in Meter Mountings, of which the following is a specification.

My invention relates to a mounting particularly adapted for use in connection with electric meters, and aims to provide a device of this character presenting certain novel features as hereinafter specified.

It is an object of my invention to provide a meter mounting in which the leads extending from the meter to the cutout or fuse box will be protected in such a manner as to prevent these leads from being tampered with, or tapped, thus avoiding the unauthorized use of current.

A still further object of this invention is that of providing a single locking means of extremely simple construction for preventing access to either the cutout box, or the protecting means encasing the leads aforementioned, so that when the parts are in position, a single operation will lock all units against movement.

The invention consists in the details of construction as hereinafter more particularly described and claimed.

In the attached sheet of drawings I have shown a practical embodiment of my invention, and in these drawings;

Figs. 3, 4 and 5 show in perspective the parts of the casing and box disassembled.

Figure 1:
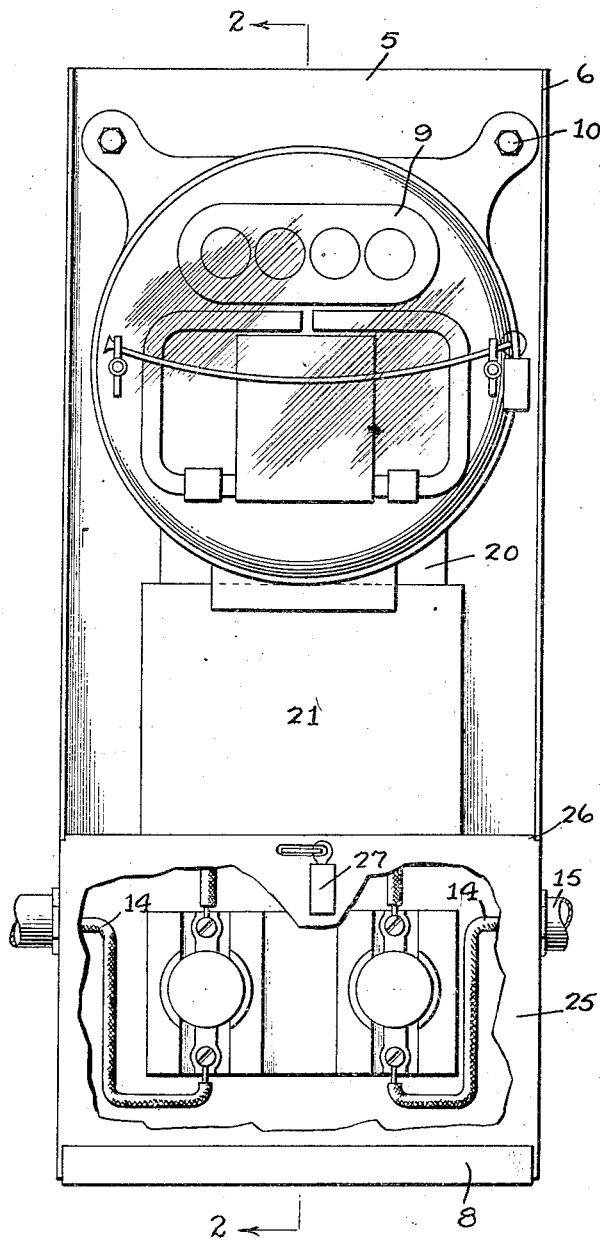
Figure 1 is a face view of a mounting embodying my improved construction.
Figure 2:
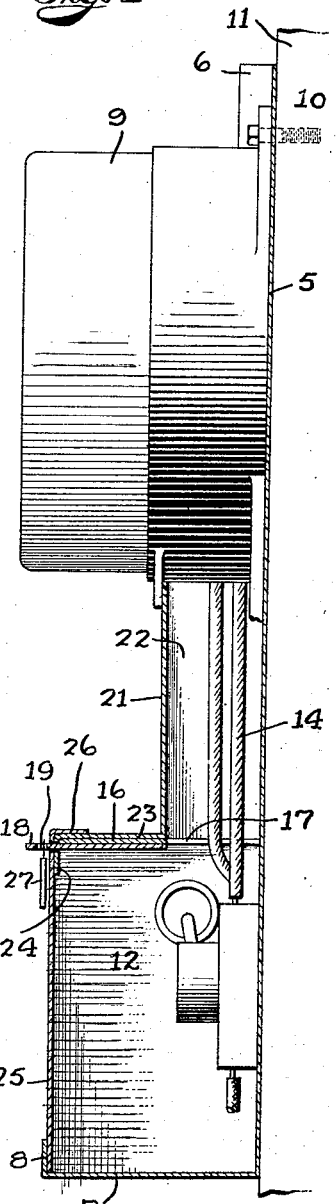
Figure 2 is a longitudinal section taken along the line 2—2 and in the direction of the arrows indicated in Figure 1.

In these views the reference numeral 5 indicates the plate which may conveniently have its side edges turned outwardly, as at 6, the lower end of the plate being also bent to extend outwardly, as at 7, whereby to provide the lower portion of the cutout box. Said outwardly extending portion is bent as at 8 to extend upwardly adjacent its end for a purpose hereinafter brought out.

The mounting proper is provided by the plate, 5, and the meter 9 is attached to this plate by any desirable means, such as screws 10, which extend through the said plate and into the supporting surface 11. Side walls 12 are provided for the cutout box, and extend to points short of the upwardly turned edge 8 of the plate end, these side walls being attached to the plate in any desirable manner, it being of course understood that the leads 14 entering into and emerging from the box, are encased in suitable conduits 15. An upper wall 16 is provided for the box, and is formed with a cutout portion or opening 17 adjacent its inner edge, and this wall has attached to it a narrow plate extending outwardly beyond its edge and terminating in a lug or ear 18 formed with an opening 19 at a point beyond the box proper.

The meter 9 being of that type which is formed with an extension 20, through which the leads 14 enter its body, I provide a casing, including an outer wall 21, and side walls 22 respectively, which has its upper end conforming to the shape of the extension 20, so as to enclose the lower edge portion of the same, it being noted that these walls are so disposed with respect to each other, as to cover the opening 17 of the box. The outer wall 21 of the casing member is bent to extend outwardly as at 23 over and adjacent the upper end of the box, and terminates in a downwardly extending portion 24 which is formed with an opening of a size sufficient to accommodate the lug or ear 18.

Finally a cover 25 is provided for closing the outer face of the box, and this cover is also formed with an opening registering with an opening formed in the downwardly extending portion 24 and through which the ear 18 may pass, and this cover is bent, as at 26, at a point beyond this opening so as to overlap the upper wall 16 of the box, as well as the outwardly bent portion 23 of the outer wall 21 of the encasing member.

In use it will be understood that the meter is primarily mounted upon the plate, and the leads 14 are connected with the cutouts or other elements disposed within the box, the leads being then passed through the opening 17, and connected with the meter mechanism. The encasing member is then applied in the manner shown in the drawings, and in this position completely envelops those portions of the leads extending between the meter and box which would otherwise be exposed. Upon the encasing member being applied in this manner it will be noted that the outwardly extending portion 23 of the same will lie flush against the upper wall 16 of the box, and the downwardly bent edge portion 24 of the member will have the ear 18 passing through its opening. To apply the cover its lower edge is inserted between the outer edges of the side walls 12, and the inner face of the upwardly turned portion 8, movement of the cover at this point being thus prevented. The cover is retained in position also by virtue of the fact that the ear 18 passes through the opening in its upper end, and this upper end in turn prevents a movement of the encasing member incident to its overlapping portion 26, so that by applying a seal 27, or other locking member to the opening 19 of the ear 18, all of the parts are prevented from being displaced.

From the foregoing it will be appreciated that the objects of this invention have been accomplished in that the leads will be inaccessible to a person desiring to tamper with the same without necessarily breaking the seal 27, although an inspector, by simply breaking this seal has all of the parts available to his inspection, and he may readily make such tests as are necessary without any danger of burning or shocking himself, or without any danger of blowing the fuses incident to short-circuiting the parts.

Also due to the construction and arrangement of the meter mounting, the meter will be held virtually integral with the plate, and thus a freedom from vibration will be assured, aside from the fact that due to the disposition of the leads, no magnetic field will be set up, it being also appreciated that the construction involved is of such simplicity as to be capable of being readily manufactured and placed upon the market at a nominal figure.

Finally it will be understood that numerous modifications of structure might readily be resorted to without in the least departing from the scope of my claims; which are:

1. A meter mounting including a plate, and a casing mounted upon said plate, said casing including side walls, and an outer wall, said outer wall having one of its ends extended outwardly and downwardly, a box mounted on said plate below said casing and having an upper wall carrying an outwardly extending lug extending through an opening in the downward extension of said outer wall.

2. A meter mounting including a plate, and a casing mounted upon said plate, said casing including side walls, and an outer wall, said outer wall having one of its ends extended outwardly and downwardly, the downwardly extending portion being formed with an opening.

3. A meter mounting including a plate having one of its ends extending outwardly and upwardly, a box forming member mounted on said plate adjacent said outwardly extending end and forming with said end a box-like construction, a casing positioned mainly above said box-like construction and having one wall thereof extended outwardly over said box forming member, means for securing one portion of said casing in position with respect to said plate, a front cover for said box-like construction a portion of which is held in position by means of the upwardly extending end of said plate, and removable means for securing said casing and cover with respect to said plate.

4. A meter mounting including a plate, side and end walls attached to said plate and extending outwardly therefrom, a casing arranged upon said plate, an outwardly extending portion forming a part of said casing and adapated to lie flush against one of said end walls, a cover for the space enclosed by said walls and adapted to overlap said outwardly extending portion, a downwardly extending portion forming a continuation of said outwardly extending portion and being provided with an opening, and means carried by said plate and adapted to extend through said opening and cover for retaining the whole in applied position.

Signed at New York, in the county of New York and State of New York this 15th day of Sept., A. D. 1922.

SVEN A. GAFVERT.